UNITED STATES PATENT OFFICE.

GEORGES NÜTH, OF NEUILLY-SUR-SEINE, FRANCE, ASSIGNOR OF ONE-HALF TO LEON TURCAT, OF NEUILLY, FRANCE.

ELASTIC PRODUCT AND METHOD OF PRODUCING THE SAME.

1,159,257.

Specification of Letters Patent.   Patented Nov. 2, 1915.

No Drawing.   Application filed October 15, 1909.   Serial No. 522,773.

*To all whom it may concern:*

Be it known that I, GEORGES NÜTH, residing at Neuilly-sur-Seine, Seine, France, have invented Elastic Products and Methods of Producing the Same, of which the following is a specification.

This invention relates to a general process for the preparation of elastic materials and substitutes for natural varnishes by the action of amins upon the products obtained by causing protohalogenids of sulfur to react upon certain fatty bodies and eventually by the polymerization and the vulcanization of these products.

Protochlorid of sulfur acting upon the fatty oils furnishes elastic products known as "factices." The atoms of chlorin are relatively feebly united to the molecules of these factices. This is why they react quite easily with the amins, which cause the complete or partial elimination of the chlorin and produce viscous masses up to the solid and elastic state or even hard and brittle masses. Now these bodies derived from factices and amins may be vulcanized and generally give rise to substances from a soft elastic state up to a very hard state and which, contrary to what is the case with the factices generally, present considerable cohesion thereby approximating in their properties to caoutchouc, vulcanized caoutchouc and even gutta percha. These same derivatives of factices and of amins, particularly those with a base of siccative oils, have a tendency to solidify further, which is perhaps due to a polymerization and which will hereinafter be designated as such. This is produced by the action of time and heat, oxidizing agents and also by auto oxidation. Thus transformed these products constitute substances which are either elastic or brittle and which generally lend themselves to vulcanization in giving elastic or brittle products. It is not, however, only the derivatives of factices and of amins which have the property of becoming polymerized but likewise these same derivatives after they have been subjected to slight vulcanization with sulfur. The polymerization of these substances likewise takes place under the influence of heat, oxidizing agents or by auto-oxidation. The result is substances resembling caoutchouc or hard and brittle products which may again be vulcanized in giving equally important products.

The slightly vulcanized products referred to above can of course be vulcanized a second time with a view to obtaining harder materials. However, the results are not exactly the same as if the vulcanization were effected with the same quantity of sulfur in a single operation. This probably arises from the phenomena of polymerization which may take place simultaneously with the first polymerization.

It is possible to operate in many other ways in order to obtain products similar to those designated above for example; to polymerize slightly then vulcanize slightly, then again polymerized and finally vulcanized.

The materials in question in as far as they are elastic may be employed in many ways as substitutes for caoutchouc and guttapercha. They also present a high electrical insulating property. Then again these substances whether they be elastic or brittle when soluble in appropriate solvents are adapted for varnishing products furnishing after evaporation of the solvent an adherent flexible transparent and brilliant film. Under the influence of heat or of siccatives these varnishes harden rapidly without becoming friable. Owing to their resistance to heat, water and alkalis they are advantageously differentiated from varnishes obtained from natural lacs or gums.

As stated above the bodies to be considered for the preparation of these products are the fatty oils and other fatty bodies in as far as they contain glyceric ethers of unsaturated fatty acids such for example as oil of linseed, China wood, pavot, maize, cotton, sesame, colza, almond, arachides, olive, castor, cod-liver, palm butter; then the fatty oils oxidized, polymerized, sulfated, sulfated and oxidized, nitrated and in short the fatty oils and fatty bodies capable of reacting with protochlorid of sulfur.

As regards the amins, amins of the fatty series and of the aromatic series may be employed, acidylamins, diamins, triamins, etc., and even ammonia, in short all compounds comprising an $NH_2$ or NH group, but particularly basic compounds, such for example as anilin, paratoluidin, metaxylidin α naphthylamin, para chloranilin, paranitro anilin, dinitroanilin 1:2:5, dehydrothiotoluidin, phenylhydrazin, para amido phenol, amido naphthol 1:5, para amido benzoic acid, mono methyl anilin, diphenyl amin, phenetidin, para phenylene diamin, benzidin, mono methyl para phenylene diamin, para amido diphenyl amin, acetyl benzidin, diamido diphenylurate, amido azobenzene, para amido benzene azo-α-napthlyamin, triamido azo benzene, rosanilin, indulins, safranins, pyrrene ($C_4H_5N$) etc., then: ammonia, monomethyl amin, dimethylamin, benzylamin, ethylene diamin, amido acetic, phenyl amido acetic, amido succinic acids or their salts, ethylic ether of amido acetic acid, carbamid, thio carbamid, guanidin, amidid of sodium, anilidid of potassium, cyanamid, etc. All these bodies are basic bodies, and where in the claims hereinafter I use the term "basic bodies," I intend to refer to the bodies described, that is, ammonia and ammonia derivatives or amins.

The products derived from the present process may be comprehensively designated by the following formula:—

in which R signifies a fatty radical, S signifies an atom of sulfur, Ha signifies an atom of a halogen, $R^1$ signifies the residue of a basic substance, and in which y=from zero to $m$ and z=from zsro to $n$. Where y=zero, all the halogen atoms have been entirely eliminated, either by the substitution of residues of the basic substance or by the separation of the factice molecule from the molecules of halogenated hydrogen. Where z equals zero, there has been no introduction into the substance of the residue of the basic substance, but merely the separation of the molecules of halogenated hydrogen from the factice molecule.

In order to prepare the substances in question, the amin is caused to act directly upon the factice (after the latter has been purified, if desired) or the reagents are diluted with products suitable for this purpose; according to requirements the vessels used may be open or closed. The addition of certain products, such as acetate of soda, carbonate of lime, etc., which facilitate the reaction between chlorated products and amins, is frequently indicated.

The products obtained by the action of the amins on the factices are from viscous, stringy and up to very hard materials. Sometimes they do not present elasticity, but frequently their elasticity is considerable. Ordinarily these products are soluble in benzene but only slightly or not at all soluble in alcohol at 90°. In hardening them, that is to say by polymerization, these products generally become less and less soluble in benzene according to the degree of polymerization. This polymerization can be effected in many ways, for example by stoving the products, dissolving them and passing a current of air or oxygen through the hot solution or in passing ozone through the cold solution, by mixing the products or their solutions with siccatives in a cold or a hot state, and so forth.

As regards slightly vulcanized products, they are ordinarily soluble in benzene, while highly vulcanized products are only slightly or not at all soluble.

Vulcanization with sulfur can be effected in accordance with the processes employed for vulcanizing caoutchouc, but vulcanization can also be effected in solution. Vulcanization with protochlorid of sulfur is preferably effected in solution. Among the products vulcanized and even among the unvulcanized products, there are some which, while being very elastic at ordinary temperatures, becomes brittle at low temperatures. This defect is obviated by incorporating in the products either prior to or after their vulcanization, bodies such as oils, sulfonated oils, gylcerin, paraffin, vaseline, waxes, anthracene, etc.

The following are examples of methods of forming the substances in question, but the invention is not of course limited thereto.

In order to shorten the description, the following abbreviations have been employed: Ordinary protochlorid of sulfur= $S_2Cl_2$. Sulfur=S. Essence of turpentine= turpentine.

The durations and temperatures should always be read as being approximate. The temperatures indicated generally refer to those obtained in the oil bath.

Example I: 25 parts of anilin and 10 parts of linseed oil factice (prepared with 30 parts of $S_2Cl_2$ and 100 parts of oil) are placed in a vessel in the oil bath, and heated to 125–135° C. while agitating; the factice disappears. When it is dissolved the heating is continued for 3 hours. The entire operation lasts for about 9 hours. The liquid, which is of a light yellow brown color is poured in a thin stream into 100 parts of alcohol; a milky, yellowish precipitate is produced which coagulates and becomes deposited in the form of viscous, slightly brown-yellow oil; it is allowed to settle and the liquid containing the excess of anilin and of hydrochlorate of anilin formed is decanted. The deposit is washed with alcohol until it has been freed from anilin and forms a viscous mass. The alcohol and the anilin are recovered by the known processes. The product washed with alcohol is dried in the water bath. It is a soft, sticky, stringy and slightly reddish brown substance. In a thin layer this product is transparent and slightly yellow; stoving varnishes can be prepared from it. It will be termed the product I and this process by precipitation in alcohol will be termed process IA. This product is soluble in benzene, ether, nitrobenzene, turpentine. HCl gives a precipitate which is almost white in the benzenic solution. Instead of pouring the liquid into alcohol it may be poured in a thin stream into water at the same time supplying a jet of dilute HCl for transforming the excess of anilin into its salt as the operation progresses. A viscous mass is obtained. After separation of the solution of anilin salt this mass is washed in water and then dried in a water bath. This constitutes the process IB. The result is a viscous, stringy, sticky mass. Various other processes can be utilized for isolating the substance in question, for example the process consisting in eliminating the excess of anilin by means of a current of steam.

*I. Methods of vulcanizing the product I.*

(a). 100 parts of product I is placed in a cauldron in an iron bath and slightly heated whereupon 15 parts of flowers of sulfur is incorporated; the temperature is raised to 135° C. The liquid mass becomes thick and this temperature is maintained for two hours.

After cooling a mass is obtained which is solid, homogeneous, dark brown in color, remarkably elastic in compression and in traction; it is slightly soluble in benzene, almost insoluble in ether and turpentine soluble in nitrobenzene.

(b). Instead of vulcanizing with 15 parts of S for 100 parts of the product I as in (a) vulcanization is effected with 5 parts S the operation being otherwise as described in (a). The result is a product of somewhat soft consistency and slightly sticky especially in the hot state, remarkably elastic in traction fairly soluble in benzene and nitrobenzene and slightly soluble in turpentine. Revulcanized with 9.5% of S (three hours at 135°) this product furnishes a solid brown elastic mass which is more pliable than the product vulcanized as in (a); it is slightly soluble in benzene and almost insoluble in ether and turpentine.

(c). A solution of 10 parts of the product I in 50 parts of heavy benzene is mixed with a concentrated solution of two parts of S in heavy benzene. Heating to 135° is effected for four or five hours. After cooling the solution is washed with dilute caustic soda lye in order to eliminate the excess of S whereupon precipitation with alcohol is effected. The deposit formed is collected and dried and a slightly soft brown mass is obtained which heated to 130° solidifies in giving a pliable and elastic product soluble in nitrobenzene turpentine less soluble in toluene and but slightly soluble in ether.

(d). 10 parts of the product I are dissolved in 80 parts of benzene a small quantity of $CaCO_3$ is added whereupon a solution of three parts of $S_2Cl_2$ in 10 parts of benzene is added. The mass thickens and is diluted with benzene, filtered and washed in benzene. This mass when dried is a light yellow product presenting slight elasticity in compression, especially when somewhat warm.

*II. Methods of polymerization.*

(a). The product I is melted and poured over plates in thin layers. The whole is stoved and heated for 10 hours to 130–140°. The mass gradually thickens; it is agitated and finally it becomes solid. When cooled this substance is dark brown in color, elastic in compression and presents a notable degree of cohesion. It is slightly soluble in benzene, very slightly soluble in ether and turpentine and more soluble in nitrobenzene. Mixed with 9% of S and heated for two hours to 130–140° this substance furnishes a solid vulcanized product brownish-black in color and remarkably elastic; it is very slightly soluble in benzene, and ether, insoluble in turpentine and fairly soluble in nitrobenzene.

(b). The product I is heated in a closed vessel for 20 to 25 hours at 135°; it becomes more viscous. At ordinary temperatures it constitutes an elastic mass which is soft but more solid than I. By vulcanization with 10% of S (2 hours at 130°) a mass is obtained which is elastic, brown-black, partially soluble in nitrobenzene, slightly soluble in benzene and almost insoluble in ether.

(c). 1 part of product I is dissolved in 4 parts of heavy benzene, heated to 100° and a current of oxygen is caused to pass through it for 2 hours while maintaining the temperature at 100°; then precipitation with alcohol is effected. The deposit collected and dried in the water bath forms a solid elastic product which is hardly sticky and soluble in turpentine and nitrobenzene. When heated to 125°–130° for 1 hour it becomes rather harder without losing its elastic properties. When vulcanized with 10% of S (1 hour at 130°) a mass is obtained which is of a grayish-brown color, solid, pliable, very elastic, soluble in a hot state in nitrobenzene and turpentine but less soluble in toluene.

(d). 3 parts of product I are dissolved in 10 parts of toluene and a small quantity of a siccative such as resinate of manganese is added and heating to 100° is effected until the solution thickens. Precipitation with alcohol is effected and the precipitate is washed with alcohol and dried. This product is a dark brown substance, slightly stringy, resisting compression but presenting but little cohesion.

(e). The product obtained in accordance with I (a) that is to say the product slightly vulcanized with 5% of S, is spread in thin layers over plates and stoved for 4 hours at 130–135°. The mass which is at first viscous gradually solidifies. When cooled it is solid, dark brown, not sticky, pliable, elastic, slightly soluble in toluene, nitrobenzene and turpentine. Vulcanized with 10% of S (2 hours at 130–135°) a very solid mass of a very deep brown color is obtained; it is fairly pliable and elastic.

(f). The product I is polymerized for 5 hours as in II (a). The resultant substance, which forms a soft slightly viscous mass, is vulcanized with 3% of S (2 hours at 130–135°). This product is spread in thin layers upon plates for polymerization in a stove (4 hours at 130–140°) then revulcanized with 10% of S (1½ hours at 130–140°). The mass obtained is of a brownish-black color, rather hard but nevertheless fairly pliable and elastic.

Example II. A mixture of 300 parts of meta chloranilin and 50 parts of linseed oil factice is heated for 5 hours at 135°. The product in fusion is poured into 750 parts of benzene. After being left the hydrochlorate of chloranilin is filtered; the filtrate is distilled for recovering the greater part of the benzene and the residue of the distillation is then poured into 1000 parts of alcohol. The subsequent treatment is effected as in Example I. The mass obtained is transparent, slightly colored brown, stringy and slightly sticky, soluble in benzene ether, nitrobenzene and turpentine. The process IB might be employed instead of this treatment. This process will serve for the preparation of a varnish giving very adherent transparent and brilliant films. By heating the mass obtained for several hours to 125° C. it hardens considerably. When vulcanized with 15% of S a coherent elastic product results.

Example III: A mixture of 150 parts of benzene and 30 parts of linseed oil factice are placed in an oil bath digester and 10 parts of compressed ammonia gas are introduced therein. The temperature is then slowly raised to about 130° and maintained for 6 to 7 hours. After cooling the excess of ammonia is allowed to escape and collected. The benzenic solution is filtered and the benzene is then recovered in distilling the filtrate. The residue of the distillation is a clear, slightly yellowish-brown mass which is soft, slightly elastic and somewhat stringy and soluble in benzene, nitrobenzene and turpentine. HCl produces a precipitate which is almost white in the benzenic solution. Heated for 8 hours in thin layers to 130–135°, it becomes more solid and forms a brown, pliable and elastic mass. Mixed with 10% S and vulcanized for 1 hour at 130° the mass obtained is brown, compressible and thoroughly coherent and soluble in nitro benzene.

Example IV: In proceeding in accordance with the processes IA or IB with a mixture of 25 parts of anilin and 10 parts of oxidized linseed oil factice (prepared with 15 parts of $S_2Cl_2$ and 100 parts of oxidized linseed oil) the resultant mass is brown, elastic, fairly solid and soluble in benzene and nitrobenzene. Vulcanized with 5% of S (2 hours at 125–135°) the product obtained is solid, compressible and fairly cohesive.

Example V: A mixture of 10 parts of linseed oil factice, 10 parts of mono ethyl para toluidin and 30 parts of crude xylene is heated for 6 to 7 hours at 130 to 140°. The liquid formed is diluted with benzene and the solution is filtered. The benzene is recovered by distillation while the residue of the distillation containing the xylene, the excess of the base and the product of condensation between base and factice is precipitated with alcohol. The mixture is allowed to settle and the floating liquid is decanted. The oily deposit is washed with alcohol and then dried. The resultant mass is brown, transparent, soft, elastic and slightly sticky: soluble in toluene, nitrobenzene, ether. HCl produces a copious precipitate in the benzenic solution. When heated for 2 hours to 130° this mass becomes more solid, not sticky and elastic. This solidified product when vulcanized with 8% of S (45 minutes at 130°) gives a grayish brown mass which is soft, not sticky, resisting compression well, resisting traction fairly well and slightly soluble in nitrobenzene. By causing a benzenic solution of 1 part of $S_2Cl_2$ to act upon a benzenic solution of 3 parts of condensation product of mono ethyl para toluidin and of linseed oil factice, in the presence of $CaCO_3$ a thick and elastic precipitate is formed. When filtered, washed with benzene and dried, this product constitutes a dark brown mass, fairly hard but nevertheless presenting a certain degree of elasticity.

Example VI: A mixture of 10 parts of linseed oil factice and 25 parts of anilin is heated to 135° for 3 hours and a half. In order to isolate the condensation product formed the process IA is adopted; the resultant mass is light yellow, only slightly sticky, resisting compression well but presenting less cohesion than product I and less soluble in benzene than the latter. The product thus prepared is subjected to the action of para toluidin, that is to say a mixture of 1 part of this product and 5 parts of para toluidin is heated for 6 hours to 125–130°. The mass in fusion is then treated by process IA. The resultant product is soft, transparent, stringy and rather sticky, soluble in benzene, ether turpentine and nitrobenzene. The etheric solution gives a thick precipitate with HCl. Heated in thin layers to 130–140° for 2 hours, this product solidifies more, ceases to be sticky and becomes very elastic. By vulcanization with 12% of S (2 hours at 130–140°) it hardens and furnishes a mass which is solid, brown, pliable and elastic; it is slightly soluble in benzene and fairly soluble in nitrobenzene.

Example VII: 1 part of meta nitroanilin is dissolved in a hot state in 10 parts of heavy benzene and 1 part of colza oil factice (prepared with 25 parts of $S_2Cl_2$ and 100 parts of colza oil) is added, then heating is effected for 6 hours at 125–130° and for 6 hours at 135–145°. The dark yellow mass in fusion is poured into 20 parts of benzene. After settling the greater part of the solvent is recovered by distillation; the residue of the distillation is then poured into 20 parts of alcohol. A light yellow precipitate is formed which coagulates into a brown viscous mass. This substance is washed in alcohol and dried. It then forms a yellow brown mass, transparent, slightly sticky but elastic and fairly soluble in benzene. The solution can be used for preparing varnishes. By vulcanization with 11% of S (1 hour at 130°) a brown, solid and elastic mass is obtained.

Example VIII: 50 parts of castor oil are dissolved in 250 parts of heavy benzene and 11 parts of $S_2Cl_2$ are added; a gelatinous mass is formed which is mixed with a solution of 50 parts of para toluidin in 125 parts of heavy benzene. The temperature is slowly raised to 125° and maintained for 15 hours at 125–135°. After cooling the hydrochlorate of para toluidin is filtered and the filtrate is then precipitated in alcohol. The rest of the operation is as in Example I. The final product is a solid, brown substance which is elastic but becomes hard and brittle with a fairly low temperature; it is moderately soluble in benzene and nitro benzene.

Example IX: A mixture of 10 parts of linseed oil factice and 25 parts of anilin is heated for 12 hours to 130–140°. The mass in fusion is precipitated by alcohol. The slightly colored oily deposit is washed with alcohol and then dissolved in benzene. This solution is again precipitated with alcohol. The deposit formed is a light yellow mass not very sticky, or stringy but fairly elastic. When dried it hardens considerably and presents a fairly hard brittle mass of resinous-appearance soluble in benzene turpentine and nitro benzene. The solutions in benzene or turpentine may serve as varnishes as they furnish transparent, adherent and sufficiently hard films.

Example X: A solution of three parts of product I in 10 parts of benzene is mixed with 1 part of iodid of ethyl and heated for 20 hours at 70 C. The subsequent treatment is in accordance with process IA and the mass obtained is soft, less stringy than product I soluble in benzene, turpentine and nitrobenzene.

Example XI: A mixture of 1 part of the condensation product of linseed oil factice and anilin (see example X). 3 parts of crystallizable acetic acid and 1 part of anhydrous acetic acid are boiled for 4 to 5 hours. The product gradually dissolves. The solution formed is then poured into water a very fine almost white precipitate is formed and coagulates into a compact gray-brown mass. In order to wash this mass it is treated with water and then dried. Thus prepared this product when somewhat hot constitutes a solid, pliable and elastic mass while at ordinary temperatures it is fairly hard and even brittle. The benzoic solution may serve for varnish.

Other condensation products between factices and amins are indicated in the table given below.

| Primary materials.—Factice of oil of— | Temperature and duration of the operation. | | Properties of the products. | Polymerizations. | | Vulcanizations. | | | Properties of the products. |
|---|---|---|---|---|---|---|---|---|---|
| | Temp. | Hrs. | | Temp. | Hrs. | S%. | Temp. | Hrs. | |
| Linseed, 1 part; α-naphthylamin, 6 parts. | 130–140 | 8 | Soft, sticky, stringy. Soluble in benzene, ether and turpentine. | 110–120 | 15 | 12 | 135 | 2 | Brown-black, solid, pliable, elastic. |
| Linseed, 10 parts; meta-amido-benzoic acid, 10 parts; xylene, 35 parts. | 135 | 34 | Light brown, rather soft, stringy, elastic. Soluble in benzene. | | | 9 | 135 | 1½ | Brown-black; good for compression; not so good as regards cohesion. |
| Linseed, 1 part; meta-toluylene-diamin, 1 part; heavy benzene, 3 parts. | 130–135 | 3–4 | Yellowish-brown, elastic, incompletely soluble in benzene. | | | 7 | 130 | 2 | Black, very hard but elastic. |
| (a) China wood, 10 parts; anilin, 25 parts. | 130–135 | 3–4 | Yellowish-brown, rather soft, stringy, elastic. Soluble in benzene. | 130–135 | 10 | 8 | 130–135 | 2 | Dark brown, solid, pliable, very elastic. |
| (b) Pavot, 1 part; anilin, 3 parts. | 125–130 | 4 | Yellowish-brown, rather soft, stringy. Soluble in benzene. | | | 15 | 135–145 | 1 | Brown-black, solid, very elastic. |
| (c) Arachides, 1 part; anilin, 4 parts. | 135 | 2 | Light yellow, almost liquid. Soluble in benzene. | 100 | 7 | 10 | 135–145 | 3 | Brown, homogeneous; rather soft, slightly sticky, resisting compression well, traction not so well. |
| (d) Olive, 5 parts; orthotoluidin, 22 parts. | 120–125 | 2 | Yellowish-brown, resists compression fairly well, little cohesion. | | | 10 | 125 | 2½ | Dark brown, not very solid, fairly elastic to compression. |
| Colza, 1 part; paratoluidin, 3 parts. | 130 | 3–4 | Soft, transparent, sticky, stringy. | 110 | 5 | 7 | 135–140 | 2 | Brown-black, solid, elastic. |
| Castor, 10 parts; metatoluidin, 3 parts. | 120 | 2 | Soft but elastic. Soluble in benzene. | 130–140 | 4 | 5 | 130 | 1 | Brown-black, very elastic, resisting compression very well. |
| Castor, 10 parts; meta-xylidin, 25 parts. | 120 | 2 | Light brown, elastic. Soluble in benzene. | | | 7.5 | 140–150 | 1½ | Brown, not sticky, elastic. |
| (e) Sulfonated castor, 1 part; anilin, 4 parts. | 135 | 3–4 | Brown, transparent, elastic. Soluble in nitro-benzene. | 100 | 7 | 10 | 130 | 2 | Black, resisting compression well, moderate cohesion. |
| (f) Sulfonated and oxidized castor oil, 1 part; paraxylidin, 4 parts. | 125–135 | 6 | Yellowish-brown, very solid, elastic, slightly sticky. Soluble in nitro-benzene. | | | 8 | 125–130 | 3 | Brown, homogeneous, slightly sticky, resisting compression well, traction not so well. |
| (g) Factice prepared with linseed oil and proto-bromid of sulfur, 10 parts; anilin, 25 parts. | 125–130 | 2½ | Soft, slightly sticky, slightly stringy. Soluble in nitro-benzene. | 105–115 | 2 | 12 | 130–140 | 2 | Rather soft, resisting compression very well and traction fairly well. |
| (h) Factice prepared with linseed oil and proto-iodid of sulfur, 10 parts; anilin, 25 parts. | 120 | 2 | Fairly solid, slightly sticky, elastic in compression, less elastic in traction. Soluble in nitro-benzene. | | | 10 | 130–135 | 2 | Brown, not sticky, pliable and elastic. |

The factices designated in this table by a b etc., are prepared in the following manner.

(a) Factice prepared with 25 parts of $S_2Cl_2$ and 100 parts of China wood oil.

(b) Factice prepared with 35 parts of $S_2Cl_2$ and 100 parts of pavot.

(c) Factice prepared with 24 parts of $S_2Cl_2$ and 100 parts of arachides oil.

(d) Factice prepared with 25 parts of $S_2Cl_2$ and 100 parts of olive oil.

(g) Factice prepared with 55 parts of $S_2Br_2$ and 100 parts of linseed oil.

(h) Factice prepared with 90 parts of $S_2I_2$ and 100 parts of linseed oil.

(e) Factice prepared with 12 parts of $S_2Cl_2$ and 100 parts of castor oil previously sulfonated with 4½ parts of S at 180–200°.

(f) Factice prepared with 9 parts of $S_2Cl_2$ and 100 parts of castor oil previously treated with 4½ parts of S, then oxidized by ozone.

I claim as my invention:—

1. A process of making a rubber-like substance, comprising the step of subjecting a factice to the action of a basic body containing nitrogen, for the purpose specified.

2. A process of making a rubber-like substance, comprising the step of subjecting a factice to the action of an amin.

3. A process of making a rubber-like substance, comprising the step of subjecting a factice to the action of a suitable ammonia derivative in the presence of a substance which facilitates the reaction.

4. A process of making a rubber-like body, comprising the step of subjecting a factice to the action of a suitable ammonia derivative, having alkaline properties and polymerizing and vulcanizing the resulting product.

5. A process of making a rubber-like body, comprising the step of subjecting a factice to the action of a basic body described, as and for the purpose set forth.

6. A process of making a rubber-like body, comprising the step of subjecting a factice to the action of a basic body described, and in the presence of a substance which facilitates the reaction.

7. A process of making a rubber-like body, comprising the step of subjecting a factice to the action of a basic body described, and vulcanizing the resulting product.

8. As a new product, a factice having its chlorin at least partially eliminated, substantially as described.

9. A process of producing an elastic material, comprising the step of subjecting a factice to the action of a compound capable of removing loosely combined chlorin from said factice, said compound containing an NH group.

10. A dehalogenized factice, said body being more resistant to heat, water and acids than natural lacs or gums, and having a greater elasticity than the corresponding chlorinated factice.

In testimony whereof I have signed my name to this specification, in the presence of two subscribing witnesses.

GEORGES NÜTH.

Witnesses:
 GUSTAVE DUMONT,
 JACQUES LEJEUNE.